May 15, 1951 W. E. ROTH 2,553,281
TIRE JACK

Filed July 9, 1946 2 Sheets-Sheet 1

INVENTOR.
William E. Roth
BY Lancaster Allwine & Rommel
ATTORNEYS.

May 15, 1951  W. E. ROTH  2,553,281
TIRE JACK

Filed July 9, 1946  2 Sheets-Sheet 2

INVENTOR.
William E. Roth
BY Lancaster, Allwine & Rommel
ATTORNEYS.

Patented May 15, 1951

2,553,281

UNITED STATES PATENT OFFICE 2,553,281

TIRE JACK

William E. Roth, Houston, Pa.

Application July 9, 1946, Serial No. 682,228

4 Claims. (Cl. 254—133)

This invention relates to vehicle wheel rim jacks, whereby a vehicle wheel may be raised from a supporting surface, removed, and another wheel substituted, employing means including wheel rim-engaging portions and a cooperating member.

An important object of the invention is to provide a novel means whereby the wheel may be jacked up by employing, in part, rim-engaging portions of the jack, the wheel weight then taken off the jack, which is removed, the wheel subsequently removed and replaced by another, the weight of the replaced wheel transferred to the jack and the wheel lowered to the supporting surface by the jack.

Another important object is to provide a vehicle wheel jack which, however, does not depend upon members hooked over the rim of the wheel, between the rim and inflated tire in replacing a wheel. Instead, the weight of the wheel is borne by a sling or a slidable projection, so that there is no danger of any damage, by the rim-engaging members, to the inflated tire.

Still another object is to employ the novel jack as a means to hoist a wheel and tire into position to be coupled to the hub flange by the stud bolts and nuts.

Other objects and advantages of the invention will be apparent during the course of the following detailed description of the invention, taken in connection with the accompanying drawings, forming a part of this disclosure, and in which drawings:

Figures 1 to 4 illustrate one form of the invention, Figures 5, 6 and 9 another form thereof, while

Figure 1 is a rear elevation of the novel jack showing its association with a wheel having a deflated tire, the wheel being shown in dots and dashes and disposed, in this view, in front of the jack.

Figure 2 is an end elevation of the same.

Figure 3 is a rear elevation of the novel jack showing its association with a wheel provided with an inflated tire, with the wheel being shown in dots and dashes.

Figure 4 is an end elevation of the jack and wheel as shown in Figure 3.

Figure 7 is a vertical section through a fragment of the jack and a wheel showing a wheel rim-engaging hook.

Figure 8 is a vertical section through another fragment of the jack and a wheel, illustrating a tire engaging element of the jack.

Figure 3:
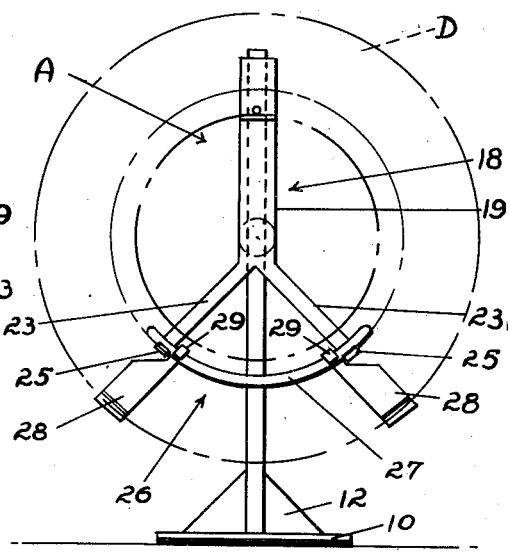
Figure 4:
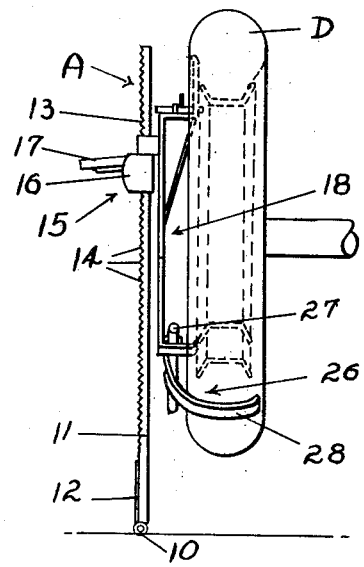
Figure 5:
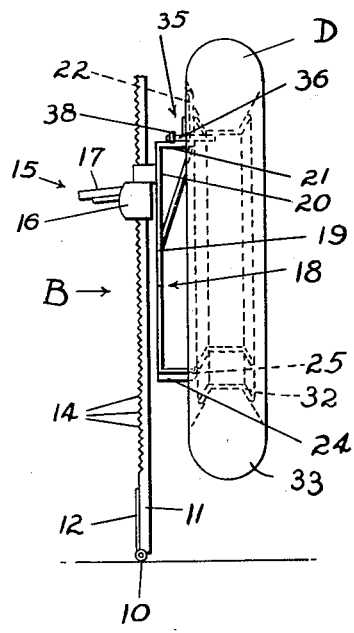
Figure 5 is an end elevation of another form of the jack, supporting a tire, shown mostly in elevation.
Figure 6:
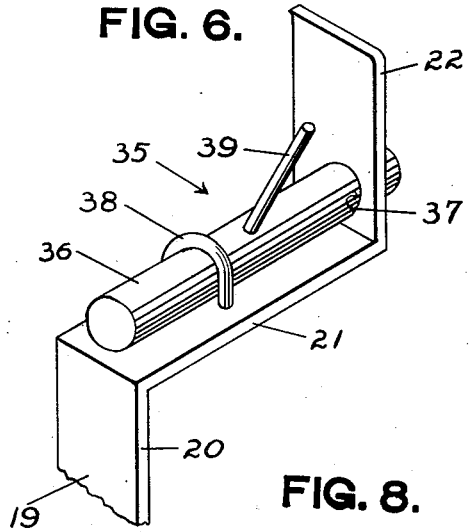
Figure 6 is a perspective view of a wheel support means of the jack of Figure 5.
Figure 9:
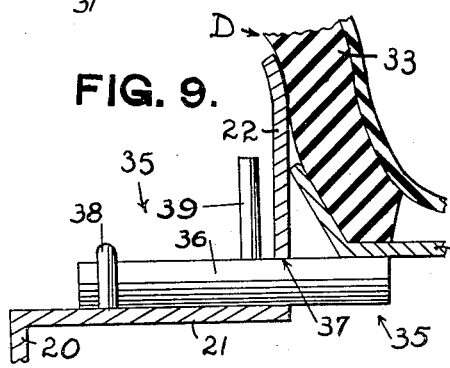
Figure 9 is a vertical section through a part of the jack of the form illustrated in Figures 5 and 6, showing a rim-engaging and supporting means.

In the drawings, wherein for the purpose of illustration are shown preferred and modified embodiments of the invention, and wherein similar reference characters designate corresponding parts throughout the several views, the letter A designates one form of the invention, shown more particularly in Figures 1 to 4, B another form thereof, shown in Figures 5, 6 and 9, C a tired wheel having a deflated or so-called flat tire thereon, and D a tired wheel provided with an inflated tire.

The novel jack A includes a base 10, which may be a short length of rigid, metallic tubing, a metallic upright or standard 11, rigidly secured thereto intermediate its ends and a substantially triangular brace 12 rigidly secured to the base 10 and upright 11. The upright 11 has a face 13 which may be provided with ratchet teeth 14 which may form part of the elevating and lowering means 15 to be next described.

This means 15 may be any conventional one. In the example shown, a conventional pawl (not shown) is disposed within a housing 16 and constructed and arranged to engage successive teeth 14 when manually manipulated by the handle 17.

Supported by the housing 16 is a wheel rim-hooking means 18 including an inverted substantially Y-shaped metallic bracket or support with its vertically-extending body portion 19 fashioned to provide, at its upper end portion 20 a short horizontally-extending section or part 21 and a short vertically-extending section or part 22 projecting upwardly from the section 21 and adapted to engage the wheel rim and the tire, as shown in Figures 2, 4, 8 and 9. The upper extremity of the section 22 may be rounded, with the tip turned slightly toward the front of the jack.

Figure 7:
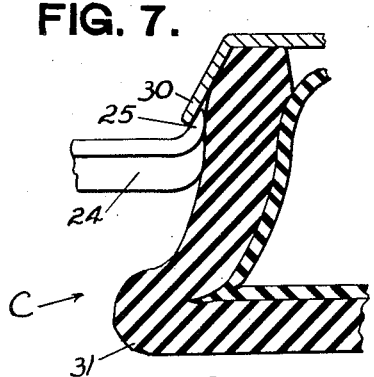
Figures 7 and 8 illustrate some of the parts common to both forms.
Figure 8:
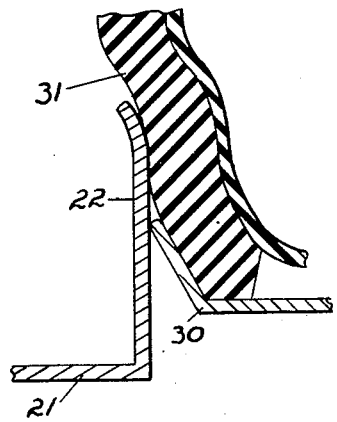

Extending from the lower end of the body portion 19 are a pair of downwardly diverging legs 23. Each leg 23 has a rearwardly-extending foot section or part 24 with a dual-purpose upturned extremity or hook 25 constructed and arranged to hook under the rim of a wheel, between the rim and deflated tire and thus support the rim as shown best in Figure 7. As may be seen in Figure 1, the section 22 engages the upper parts of the wheel rim and tire as the two spaced-apart upturned extremities 25 hook under the lower edge of the rim. Since the base 10 is tubular, the jack A may rock, as is necessary, thereon as the wheel is raised or lowered by the jack but the relationship of the section 22 and extremities 25 of the sections 24 is maintained the same throughout the operations.

Detachably supported upon the foot sections 24 is a suspension means, comprising a rigid, metallic sling 26 shown particularly in Figures 3 and 4. This sling includes an arcuate, preferably cylindrical hook-engageable section or bar 27, constructed and arranged to be supported by the foot sections 24 and prevented from sliding off them by the hooks 25 and the legs 23. Depending from the section 27 and included in the sling are a pair of arcuate, tire-engaging sections or parts 28. These diverge downwardly and, as may be seen in Figure 3, they extend in the same general direction as do the legs 23 but, since they are arcuate, they project rearwardly of the upright 11. It will be noted in Figure 3 that these sections 28 join the section 27 at such spaced-apart junctures 29, that the junctures engage the inner edges of the foot sections 24 and thus prevent shifting of the sling 26 with respect to the means 18, yet the sling 26 may be readily detached from the means 18.

Figure 1:
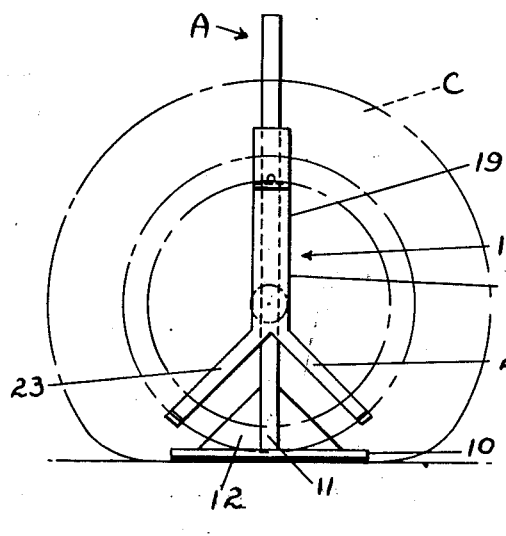
Figure 2:
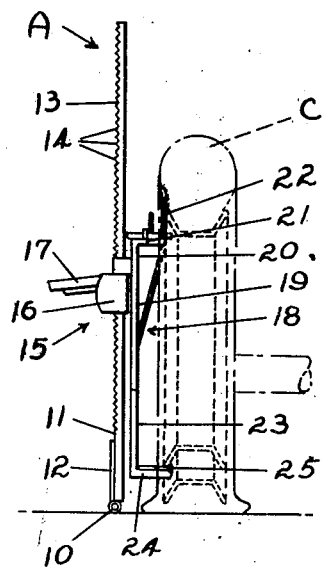

In use, the jack A is positioned as in Figures 1 and 2, with the means 16 lowered by the means 15 so that the hooks 25 will engage the rim 30 of the wheel C and the section 22 will engage the rim 30 and tire 31. Upon manipulation of the means 15 to raise the wheel B clear of the supporting surface, suitable means (not shown), as blocks, may be placed under the wheel axle to maintain the wheel raised above this surface. The wheel C may now be removed from the hub flange, as is well known in the art, and then removed from the jack A. Next, the sling 26 is placed in position as described and the inflated tire D placed upon the sling, as in Figures 3 and 4, but the hooks 25 do not hook under the rim 32. They and the section 22 simply engage the rim 32 and tire 33. As may be seen by comparing Figures 2 and 4, the relative positions of the section 22, tire and rim are the same. Therefore, when the wheel D is upon the sling, it is in a position to be operatively secured to the hub flange of the vehicle axle. In fact, since wheels are often heavy and difficult for some persons to lift and manipulate so that the stud bolts will enter the perforations of the rim, it is now obvious that the jack A may be laid upon the ground, sling uppermost, a wheel D rolled upon the jack and inserted into the sling and the jack and tire then raised (the former rolled or rocked upon its base 11) and, when the jack is vertical, the wheel D is in position to be readily secured to the hub flange.

Subsequently, by manipulating the means 15 to raise the axle slightly, the blocks or other device for temporarily maintaining the axle raised, may be removed, the means 15 again actuated to cause the wheel D to lower to the supporting surface, and the jack A removed.

In the case of the deflated tire of the wheel C the hooks 25 are readily inserted between the rim 30 and tire 31 and support the wheel rim and tire, but the wheel rim and inflated tire of wheel D are supported by the sling, since it would be both difficult and damaging to the tire to attempt to insert or remove the hooks between or from the rim 32 and tire 33.

As for the form B, shown particularly in Figures 5, 6 and 9, the same is much like the form A, but the sling 26 is not employed. Similar reference characters designate like parts in the two forms.

In place of the sling 26, the form B employs merely a suspension means comprising a bolt 35. This bolt includes a substantially cylindrical section 36 disposed for sliding along the upper face of the horizontally-extending section 21 and slidable through a perforation 37 at the lower end of the section 22 to project therefrom and support the wheel rim of the tire D. The section 36 is retained against tipping and transverse movement by an inverted-substantially U-shaped member 38 with the bight thereof about the section 36 and the legs thereof secured to the section 36 for sliding the section in either direction.

In removing a wheel having a deflated tire, the operator manipulates the jack B and wheel exactly as described for operation of the jack A but, in the case of the wheel provided with an inflated tire, to be substituted for the former, the wheel D is manipulated so that the bolt section 36 is extended to engage the inner periphery of the wheel rim and the procedure is substantially the same as when employing the sling.

Various changes may be made to the forms of the invention herein shown and described without departing from the spirit of the invention or the scope of the following claims.

What is claimed is:

1. In a tire jack, a standard; a vertically-disposed body portion slidably secured thereto and having, at its upper end part, a substantially horizontally-extending part and a short part projecting upwardly from the horizontally-disposed part and provided with a tire-engaging face, said body portion having, at its lower end, a pair of downwardly-diverging legs with a short foot part at the lower extremity of each leg and extending away from said standard, said foot part including an upwardly extending hook at the free end of each foot part and a tire-engaging sling depending from said hooks and having a removable connection therewith; and means to raise and lower said body portion longitudinally of said standard the length of said feet being such that when said tire-engaging face engages a tire upon a rim, and said hooks are hooked under the rim, said tire will substantially parallel said body portion.

2. In a tire jack, a standard; a vertically-disposed body portion slidably secured thereto and having, at its upper end part, a substantially horizontally-extending part and a short part projecting upwardly from the horizontally-disposed part and provided with a tire-engaging face, said body portion having, at its lower end, a pair of downwardly-diverging legs with a short foot part at the lower extremity of each leg and extending away from said standard, said foot part, and means carried by one of said sections to support a tired wheel including an upwardly extending hook at the free end of each foot part and a tire-engaging sling depending from said hooks and having a removable connection therewith, said sling having a hook-engageable part, supported upon said foot parts and a pair of spaced-apart, arcuate tire-engaging parts extending downwardly from said hook-engageable part; and means to raise and lower said body portion longitudinally of said standard.

3. In a tire jack, a standard; an inverted, substantially Y-shaped, vertically-disposed body portion slidably secured thereto and having, at its upper end part, a substantially horizontally-extending part and a short part projecting upwardly from the horizontally-disposed part and provided with a tire-engaging face, said Y-shaped body portion having a foot part at the lower extremity of each leg and extending away from said standard, and means carried by one of said parts to support a tired wheel including an upwardly extending hook at the free end of each foot part and a tire-engaging sling depending from said hooks and having a removable connection therewith, said sling having a hook-engageable part, supported upon said foot parts and a pair of spaced-apart, arcuate tire-engaging parts extending downwardly from said hook-engageable part and secured thereto at locations on said hook-engageable parts inwardly of and in abutment with said foot parts.

4. In a tire jack, a standard; a vertically-disposed body portion slidably secured thereto and having, at its upper end part, a substantially horizontally-extending part and a short part projecting upwardly therefrom and provided with a tire-engaging face and an opening adjacent the juncture of the two last-named parts, said body portion having, at its lower end, a pair of downwardly-diverging legs with a foot part at the lower extremity of each leg extending away from said standard, and means carried by said body portion to support a tired wheel, including a tire sling carried by said feet, and a horizontally-reciprocable bolt supported by said substantially horizontally-extending section and slidably projecting through said opening and constructed and arranged to extend under and contact the tire rim of said tired wheel; and means to raise and lower said body portion longitudinally of said standard.

WILLIAM E. ROTH.

REFERENCES CITED

The following references are of record in the file of this patent:

UNITED STATES PATENTS

| Number | Name | Date |
| --- | --- | --- |
| 1,392,355 | Rhode | Oct. 4, 1921 |

FOREIGN PATENTS

| Number | Country | Date |
| --- | --- | --- |
| 111,024 | Australia | July 11, 1940 |
| 658,168 | Germany | Mar. 24, 1938 |
| 678,669 | Germany | July 20, 1939 |
| 791,725 | France | Oct. 7, 1935 |